US005255020A

United States Patent [19]

Martin et al.

[11] Patent Number: 5,255,020

[45] Date of Patent: * Oct. 19, 1993

[54] PRINTING ASSEMBLY FOR FRANKING, OBLITERATING MACHINE OR THE LIKE

[75] Inventors: Claude Martin, Saint Germain en Laye; Francis Chevillon, Paris, both of France

[73] Assignee: Secap, Boulogne Billancourt, France

[ * ] Notice: The portion of the term of this patent subsequent to Jun. 30, 2009 has been disclaimed.

[21] Appl. No.: 830,445

[22] Filed: Feb. 4, 1992

Related U.S. Application Data

[63] Continuation of Ser. No. 459,809, May 15, 1990, Pat. No. 5,126,753.

[30] Foreign Application Priority Data

Sep. 19, 1988 [FR] France ............................. 88 12171

[51] Int. Cl.[5] ..................... G01D 15/16; G01D 15/18; G06F 15/20; G06G 7/48

[52] U.S. Cl. ................................ 346/140 R; 346/1.1; 364/464.02

[58] Field of Search ...................... 346/1.1, 75, 140 R; 364/464.02; 271/195, 276; 101/91; 235/101

[56] References Cited

U.S. PATENT DOCUMENTS

| | | | |
|---|---|---|---|
| 4,447,817 | 5/1984 | Naramore | 346/75 |
| 4,463,361 | 7/1984 | Koumura et al. | 346/134 |
| 4,757,189 | 7/1988 | Daboub | 235/462 |
| 5,038,153 | 8/1991 | Liechti et al. | 346/140 R |
| 5,126,753 | 6/1992 | Martin et al. | 346/1.1 |

*Primary Examiner*—Benjamin R. Fuller
*Assistant Examiner*—Eric Frahm
*Attorney, Agent, or Firm*—Foley & Lardner

[57] ABSTRACT

A printing assembly having a guiding and driving system for moving an article past ink emission nozzles. A detecting device detects the movement of the article through the assembly and based on that detection triggers emission of ink by the nozzles. Compressed air jets are forced toward the article, creating suction due to the Bernoulli effect which effectively maintains the article a set distance from the nozzles.

9 Claims, 3 Drawing Sheets

PRINTING ASSEMBLY FOR FRANKING, OBLITERATING MACHINE OR THE LIKE

Figure 2:
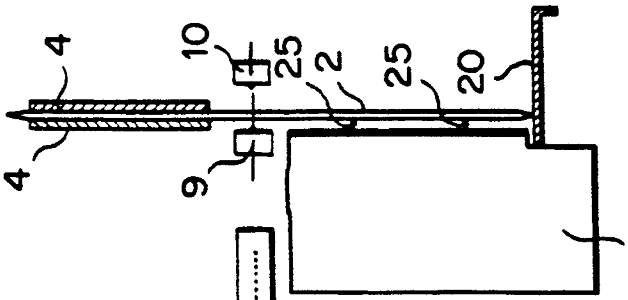

This application is a continuation of application Ser. No. 07/459,809, filed May 15, 1990, now U.S. Pat. No. 5,126,753.

The invention relates to an ink-jet printing assembly for printing on rapidly moving articles of correspondence, especially in a cancelling, .franking or more generally stamping machine.

Such an assembly known, for example, from the document GB-A-2,110,854 comprises printing heads equipped with ink emission nozzles, means for guiding and driving the article or support to be printed in front of the said nozzles and means for detecting the advance of the support, triggering the emission of ink by the said nozzles.

In a cancelling machine, it is desirable to print a standardized postal impression of the dimensions 80 mm x 25 mm in the upper right-hand corner of the postal consignments. In a franking machine, the width of the zone to be printed can assume a higher value, without this in any way changing the conditions and solutions presented hereafter. The processing speed must be capable of reaching a plurality of meters per second, and in this respect the printing heads employing the "drops on demand" technique with a piezoelectric actuator make it possible to reach a linear speed which can attain 2 m/s with a writing density of 4 to 6 dots per mm [that is to say 100 to 150 dpi (where dpi is the abbreviation of "dots per inch")].

To function correctly with a high-performance ink jet, it is necessary to control accurately:

The distance between the nozzles producing the drops and the surface of the paper.

The emission of the ink drops as a function of the advance of the paper in order to prevent image distortions.

This latter condition must be satisfied at all events, but with even greater accuracy with printing systems in which the spacing of the nozzles is greater than the spacing of the dots, thus making it necessary to incline the line of the nozzles in relation to the direction of movement of the paper.

It will be appreciated that, under these conditions, the emission moments of the various nozzles must be staggered in order to compensate their spatial stagger attributable to the inclination. This spatial stagger is of the order of approximately one hundred elementary steps (the distance between two adjacent drops), and to prevent visible distortion the relative error in the stagger must be less than one per cent.

In order to control the distance between the nozzles and the paper, one idea was to use a bearing plate for the flat articles, projecting slightly relative to the nozzles, and a system of belts retaining the article on its rear face and laying it against the bearing plate; such a system has two disadvantages:

it is not possible to lay the paper on a guide just after printing because there is a high risk of smudging, if the thickness of the article is not uniform, this causes bearing irregularities which impair the printing quality.

In order to adjust the emission of the drops exactly, the document GB-A-2,110,854 envisages detecting exactly the passage of the article at a given point, for example by detecting its front edge, and subsequently triggering a time base adjusting the emission of the drops. This solution is unsuitable because it then makes it necessary to regulate the speed of the paper with a tolerance impossible to achieve in practice. There must therefore be a device which is coupled closely to the advance of the paper and which generates the moments of release of the successive drops. For this purpose, there was the idea of using a mechanical pulse transmitter coupled to the flat article. Such a system can consist of a driving roller which drives the article of correspondence without slip and on which is mounted a pulse generator connected in terms of rotation, or of a roller connected to a pulse generator mounted loosely in terms of rotation and pressed by a spring arm against the article of correspondence or against the means of driving the article (roller or belt); such systems function well with articles of uniform thickness. In contrast, when the articles are letters filled unevenly, it is troublesome to compress them between two rollers, and this can cause local deformations of the paper which impair the printing quality.

The object of the invention is to provide a satisfactory solution to these two fundamental problems.

According to a first aspect of the invention, the means for guiding and driving the printing assembly comprise a device for maintaining the article at a distance from the nozzles by suction by means of compressed-air jets functioning under Bernouilli conditions; thus, an "air cushion" separates the printed surface of the paper and the surrounding articles, preventing any risk of smudging. Such a solution is therefore completely different from known solutions where perforated belts connected to aspiration means generate a suction which lays the support against the belt, without any self-regulation of a maintaining distance, as in the present invention.

Advantageously, the device for maintaining the support consists of plates which are pierced with holes and which are arranged substantially on the periphery and in the vicinity of the set of nozzles in a plane closely adjacent to that of the said nozzles; alternatively, the holes can be integrated in the printing heads comprising the nozzles, and it is advantageous to provide means for recovering the emitted air (for example, collecting grooves and aspiration holes).

According to a second aspect of the invention relating to the detection means, these comprise a device for the virtually permanent detection of an edge (usually both from the devices where the edge of the article is detected only once or only a very restricted number of times and from the devices where the permanent or virtually permanent detection relates not to the article itself, but to another movable component, the movement of which is considered to be linked unequivocally to that of the article.

According to one embodiment of the invention, this device comprises a row of optical sensors arranged in parallel with the movement of the article. Two consecutive sensors of this plurality of sensors are uniformly spaced at a step equal to steps of the elementary dots of the image to be printed, n being an integer equal to or greater than 1.

When n is equal to 1, the number of sensors is therefore equal to the maximum number of dots to be marked in the direction of movement, plus the stagger between the two end nozzles which is expressed as a number of dots. These sensors and the optical system including them are arranged in such a way that, whenever the article to be marked covers the distance equal to the printing step of the dots, a cell is illuminated or darkened by degrees. Such a row of sensors can be produced with discrete components or with integrated components of the CCD type (charge-coupled detection device).

According to another embodiment, the detection device comprises a generator of a light pencil scanning the space step by step along the path of the article. More specifically, the position of a narrow light beam is directed on the front edge of the article by means of a rotating mirror actuated by means of a motor of controlled position; the location of the position of the article is obtained by reading the position of the motor.

Figure 1:
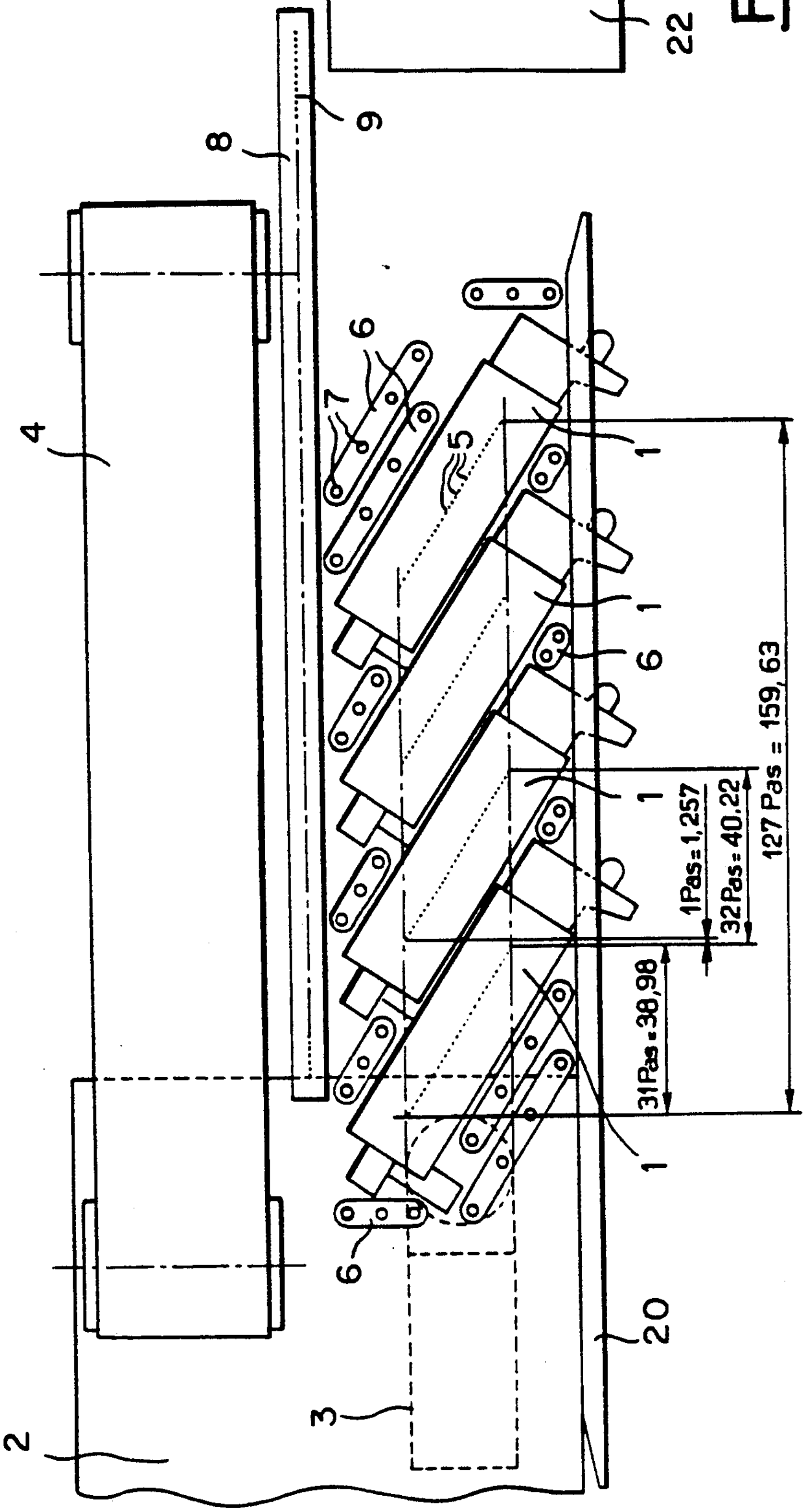
Figure 3:
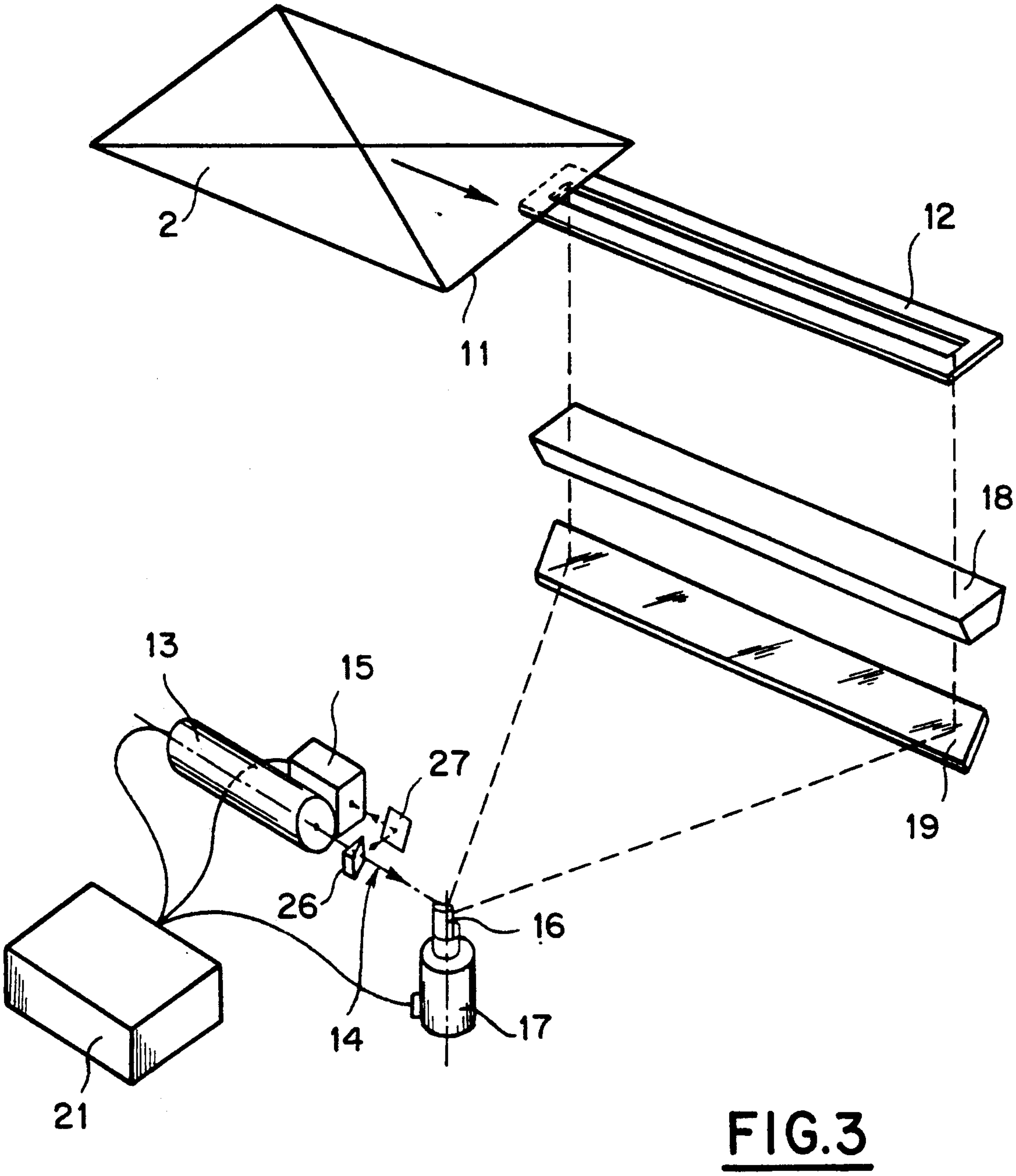
Figure 4:
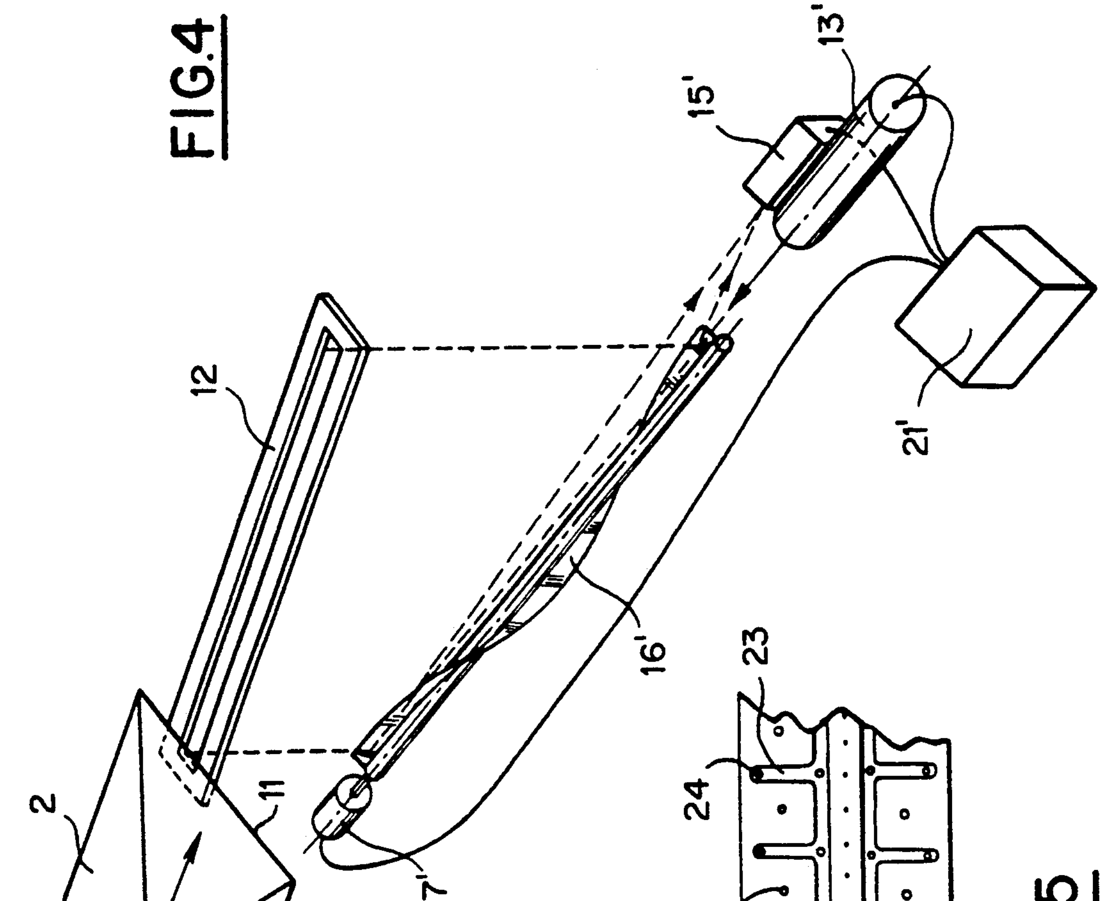
Figure 5:
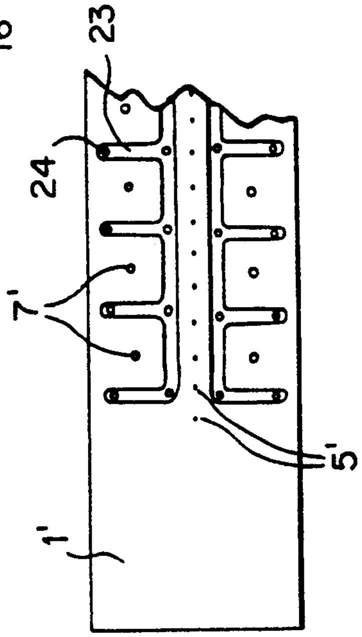
Figure 6:
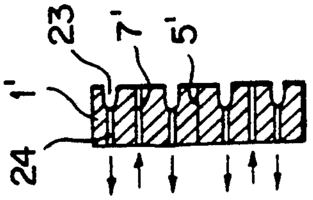

Other characteristics and advantages of the invention will emerge reading the following description made with reference to the accompanying drawings in which:

FIG. 1 is a diagrammatic front view of a printing assembly according to the invention, FIG. 2 is a partial diagrammatic side view of the assembly of FIG. 1, FIG. 3 shows a diagrammatic perspective view of a first alternative version of the detection device of the assembly of FIG. 2, FIG. 4 shows a diagrammatic perspective view of a second alternative version of the detection device of the assembly of FIG. 2, FIG. 5 shows the partial front face of a printing head modified according to an alternative version of the invention, FIG. 6 shows a diagrammatic cross-section through the head of FIG. 5.

The printing assembly according to the invention comprises ink-jet printing heads 1 arranged so as to be capable of printing a standardized postal impression, represented by the broken lines 3, on a support or article of correspondence 2 moving past The article 2 moves past by means for continuous driving, consisting, for example, of two endless belts 4 gripping the article or of a belt and a pressure pad. The belt passes conventionally over free-running rollers and rollers driven by a motor system.

A horizontal guide fence 20 guides the lower edge of the article 2 to be printed.

According to the embodiment illustrated, printing heads 1 manufactured by DATAPRODUCTS under the reference "Ultrajet 96/32" are used. These heads comprise 32 inkprojecting nozzles 5 spaced at 1.483 mm. By inclining the nozzles relative to the direction of movement of the paper, it is possible to vary the distance between two adjacent dots on the paper and therefore simultaneously to vary the step of the 32 traces and the total printing height, in order to obtain a desired density of 128 dots per inch (approximately 5 dots per mm).

Moreover, it is easy to calculate that, by assembling 4 heads inclined at 32° 03' stacked on one another, in such a way that the traces of the 4 heads are staggered at 0.195 mm, an impression of 160 mm×25 mm thus conforming to the various postal regulations can be obtained. The corresponding steps are indicated in FIG. 1. Each head 1 covers a height of 24.415 mm, over which it is capable of addressing the 32 nozzles individually in order to form 32 dots at the step of 24.415/31=0.78 mm. The 4 heads are slightly staggered in terms of height at 0.195 mm relative to one another; they therefore complete one another so as, by interlacing, to form 128 lines of dots spaced at 0.195 mm. As illustrated in FIG. 2, the printing heads 1 as a whole are grouped in a supporting and retaining member 22.

Arranged round the printing heads are a plurality of plates or bars 6 which are pierced with holes 7 and the plane front face of which terminates a little above the plane of the ink-projecting nozzles 5; the holes 7 of these bars 6 are put in communication with the compressed-air source (not shown) by means of conventional solenoid valves which make it possible to generate a jet or stream of air in the holes at the appropriate moments. When a sheet of paper is at a short distance from the plates or bars 6, these streams of air will generate a suction effect which stabilizes the sheet at a very small distance from the front face of the bars; this effect and the balancing distance depend on the speed of the air (the so-called Bernouilli effect) and can therefore be adjusted to the desired value. As can be seen in FIG. 2, the device of the invention maintains, between that face of the article 2 to be printed and the front plate of the nozzles and of the bars (substantially the front face of the supporting and retaining member 22), a clear distance which is covered by the ink jets 25 emitted by the nozzles 5.

More specifically, the air discharged under pressure via the holes 7 is forced, in the presence of a sheet of paper 2, to change direction abruptly and circulate along divergent paths in the space contained between the paper 2 and the surface of the bar 6. If the initial conditions are such that this space is small enough to ensure that the cross-section offered for the passage of the air is sufficiently reduced, the increase in the speed of the air causes a decrease of its pressure according to the so-called Bernouilli equation which, for a compressible fluid in the absence of force, volume or field, assumes the simplified form:

$$V^2/2+\int dp/\rho=C,$$

where V denotes the local speed of the fluid, dp the pressure variation, $\rho$ the local specific mass and C a constant. This effect produces a suction force which, when the paper/bar distance is sufficiently small, greatly exceeds the effect in the opposite direction attributable to the pressure of the jet of air coming out of the hole or holes. Moreover, this suction effect varies inversely to the said distance, thereby stabilizing this distance and providing a means for guiding the paper, without there being any solid contact.

In FIG. 1, the guide bars 6 are arranged round the actual printing heads 1. In an alternative version of the invention (FIGS. 5 and 6), the holes 7' are formed on the heads 1' themselves, in the vicinity of the inkejection holes 5', thereby making the system both more compact and more efficient. Should the holes 7' be very close together, it was noted that the ejection of the air in parallel with the surface of the front plate of the head could disperse the ink jet to a greater or lesser extent and impair the printing quality; to rectify this defect, recovery grooves 23 are made in the said plate; these grooves 23 are connected to orifices 24 made in this plate and themselves connected to a pump which sucks up the disturbing air jets again.

The device for detecting the article 2, illustrated in FIGS. 1 and 2, comprises a row 8 of optical cells 9: these cells 9 number approximately 1,200 at a step of approximately 0.2 mm. This row of cells can be produced in various ways by using "scale" components; however, the best way is to use an integrated sensor called a C.C.D. (charge-coupled detector) which combines on a single chip 1,728 to 2,432 cells assembled as a shift register; because of the dimensions of the chip, an optical system will be used to project the image of the letter onto the sensor; at all events, the object of this network of cells is to follow the progress of the letter step by step, so as to trigger the emission of each dot accurately. There is a printing length of 80 mm, and from top to bottom of the impression to be made, in view of the stagger between the various nozzles, it is necessary to maintain a stagger of 159.63 mm, that is to say a total tracking length of the letter equal to 240 mm, the requisite resolution being 25/128=0.1953 mm. It is therefore necessary to have 240/0.1953 useful cells, that is to say 1,229.

Located opposite the system of receiving cells 9 is a light source 10 consisting of a fluorescent tube, the axis of which is arranged in parallel with the row 8 of sensors 9.

Such a system, as described above, completely eliminates any problem of printing quality which could arise as result of the irregularity of the speed of advance or [sic]printing support, at least as long as the effect of the transit time of the ink drops can be ignored. However, there are uses for which this system can be considered too costly; in this case, an alternative version involving multiplying the step of the cells in an integral ratio is preferred. If, for example, there is only one cell every three steps (that is to say, in the example given, a cell step equal to $3\times0.1953=0.5859$ mm), the moment of ejection of each drop of ink is determined successively and alternately by the detection of the front edge of the printing support by a cell, and by means of a time base performing the interpolation between the signals transmitted by two adjacent cells; this interpolation can adopt various principles well known in the electronic art: for example, the technique of the phase-controlled oscillator making it possible to multiply the frequency of a virtually periodic signal, or the technique of the digital time base which supplies signals replacing those which would be obtained from the omitted cells, this time base being adjusted continuously by the measurement of the time elapsed between two successive signals coming from the cells. The use of these methods makes it possible to reduce the cost of the sensors, but in contrast makes the system a little sensitive to the speed variations.

According to an alternative version of the device for detecting the article 2, the detection of the said article is obtained by the tracking of its front edge by means of a fine light pencil.

In this case, the row of optical sensors 9 shown in FIG. 1 is replaced by a transparent window 12, behind which the device which will be described is placed.

This device shown in FIG. 3 comprises:

A laser 13 emitting a narrow light pencil 14 of very small divergence, the diameter of which is of the order of 0.2 to 0.5 mm.

Associated closely with this laser, a photoelectric receiver 15 (hereafter called a sensor), the optical axis of which coincides with that of the laser 13. In practice, as shown in the Figure, the theoretical coincidence of the optical axes is obtained as result of a physical separation of the outgoing beam 14 and return beam 28 by means of a semi-reflecting mirror 26 interposed in the light pencil emitted by the laser 13 (and, where appropriate, other deflecting mirrors, such as the mirror 27).

A rotating mirror 16 driven by a stepping motor 17 located on the optical axis common to the laser 13 and to the receiver 15 and arranged so as to allow the laser beam to scan the zone of passage of the letter via the transparent window.

A correcting lens 18 intended for linearizing the movement of the laser pencil as a function of the rotation of the stepping motor (mirror-angle/linearmovement relation), and a deflecting mirror 19.

An electronic system 20 for controlling the stepping motor 17, circuits for amplifying and processing the signal from the photoelectric receiver and supply circuits for the laser 13.

The assembly as a whole functions as follows: Between two successive letters, the initial position of the laser spot is adjusted to the end of the transparent window 12 on the side where the letter 2 is expected; in this position, no obstacle is encountered by the beam and the sensor receives nothing in return. When a letter 2 travels along, its front edge intersects the beam at a given moment; the sensor 15 then receives the diffused light in return, and the control system of the motor causes the motor 17 to advance one step; the sensor continues to receive nothing, and the motor remains in the position thus adopted, until the letter once again reaches the new position of the beam. It is thus sufficient to count the number of steps imposed on the motor 17 in order accurately to detect the position of the letter 2.

In another alternative version illustrated in FIG. 4, the plane rotating mirror is replaced by a helical reflecting surface 16, the axis of which is that of the stepping motor 17. The laser 13' and sensor 15' system has its optical axis arranged in parallel with this axis, in such a way that, as result of the rotation of the motor 17', the light rays scan the letter passage window. In this alternative version, there is no need to provide a linearity correcting lens. An electronic system 21' controls the motor 17' and the circuits of the laser 13' and of the sensor 15'. For the sake of simplification, FIG. 4 has omitted the beam-separating and deflection system illustrated in FIG. 3 for the laser and its associated sensor.

Indications of distances and of steps are given by way of illustration in FIG. 1.

We claim:

1. A printing assembly for a franking, canceling or stamping machine, comprising: a) ink emission nozzles; b) means for guiding an article to be printed in front of said nozzles; c) means for driving said article in front of said nozzles; and d) means for detecting movement of said article through said assembly, said means for detecting triggering emission of ink by said nozzles, and wherein said means for detecting comprises a device for constantly directly detecting a location of a moving edge of said article which is substantially transverse to a direction of movement of said article such that the detected location of said moving edge is indicative of a location of said article as said article passes through said assembly.

2. An assembly according to claim 1, wherein said detection device further comprises a row of optical sensors arranged in parallel to said direction of movement of said article.

3. An assembly according to claim 2, wherein said row of optical sensors are integrated in a charge-coupled detector.

4. An assembly according to claim 1, wherein said detection device further comprises means for generating a light pencil and means for scanning a space step by step along a path of said article.

5. An assembly according to claim 4, wherein said means for generating comprises a laser which generates said light pencil, and said means for scanning comprises a rotating mirror in communication with said light pencil and a stepping motor which rotates said rotating mirror.

6. An assembly according to claim 4, wherein said means for generating comprises a laser which generates said light pencil, and said means for scanning comprises a helical reflecting surface in communication with said light pencil, and a stepping motor which rotates said helical reflecting surface.

7. A printing assembly for a franking, canceling or stamping machine, comprising: a) ink emission nozzles; b) means for guiding an article to be printed in front of said nozzles; c) means for driving said article in front of said nozzles; and d) means for directly detecting movement of said article, said means for detecting triggering emission of ink by said nozzles; and wherein said means for detecting comprises a plurality of optical sensors for directly detecting a location of a moving edge of said article which is transverse to a direction of movement of said article, said sensors being uniformly spaced along a path defined by said direction of movement of said article.

8. An assembly according to claim 7, further comprising successive elementary dots of an image to be printed wherein said successive elementary dots are uniformly spaced by an interval and said sensors are uniformly spaced at n intervals of said elementary dots, n being an integer equal to or greater than 1.

9. An assembly according to claim 8, wherein said plurality of optical sensors are integrated in a charge-coupled detector.

* * * * *